(12) United States Patent
Chakraborty et al.

(10) Patent No.: US 7,947,204 B2
(45) Date of Patent: May 24, 2011

(54) POLY(ARYLENE ETHER) COMPRESSION MOLDING

(75) Inventors: Manatesh Chakraborty, Bangalore (IN); Hua Guo, Selkirk, NY (US); Lakshmikant S. Powale, Maharashtra (IN)

(73) Assignee: Sabic Innovative Plastics IP B.V. (NL)

( * ) Notice: Subject to any disclaimer, the term of this patent is extended or adjusted under 35 U.S.C. 154(b) by 1305 days.

(21) Appl. No.: 10/826,887

(22) Filed: Apr. 16, 2004

(65) Prior Publication Data

US 2005/0230869 A1    Oct. 20, 2005

(51) Int. Cl.
*B29C 59/00* (2006.01)
*B29C 59/02* (2006.01)

(52) U.S. Cl. ........ 264/122; 264/125; 264/126; 264/241; 264/299; 264/319; 264/320; 264/322; 264/325; 264/331.11

(58) Field of Classification Search ........................ None
See application file for complete search history.

(56) References Cited

U.S. PATENT DOCUMENTS

| | | | | |
|---|---|---|---|---|
| 3,078,254 A | | 2/1963 | Zelinski et al. | 260/45.5 |
| 3,265,765 A | | 8/1966 | Holden et al. | 260/876 |
| 3,297,793 A | | 1/1967 | Dollinger | 260/879 |
| 3,356,761 A | * | 12/1967 | Fox | 522/138 |
| 3,402,159 A | | 9/1968 | Hsieh | 260/85.1 |
| 3,408,437 A | | 10/1968 | Wheeler et al. | 264/226 |
| 3,594,452 A | | 7/1971 | De La Mare | 260/880 |
| 4,154,775 A | | 5/1979 | Axelrod | 260/874 |
| 4,492,805 A | * | 1/1985 | Besecke et al. | 568/12 |
| 4,888,397 A | | 12/1989 | van der Meer et al. | 525/391 |
| 5,147,722 A | * | 9/1992 | Koslow | 428/402 |
| 5,294,667 A | * | 3/1994 | Weiss et al. | 525/68 |
| 5,767,426 A | * | 6/1998 | Oliver et al. | 75/246 |
| 6,194,518 B1 | * | 2/2001 | Singh et al. | 525/191 |
| 6,359,043 B1 | * | 3/2002 | Gijzen | 524/147 |
| 6,534,564 B2 | * | 3/2003 | Hanejko et al. | 523/139 |
| 2002/0198123 A1 | * | 12/2002 | Nitzsche | 510/188 |
| 2005/0098916 A1 | * | 5/2005 | Umetsu et al. | 264/122 |

FOREIGN PATENT DOCUMENTS

| | | |
|---|---|---|
| DE | 41 40 499 | 12/1991 |
| EP | 0 640 640 | 8/1994 |
| EP | 1 389 514 | 5/2002 |
| GB | 1264741 | 4/1969 |
| GB | 2043083 | 3/1979 |
| JP | 2000-167827 | 6/2000 |
| JP | 2000302877 | * 10/2000 |
| WO | WO02094529 | * 11/2002 |

OTHER PUBLICATIONS

Harper, Charles A., Modern Plastics Handbook, McGraw-Hill, Nov. 20, 2002, section 6.2.3.*
International Search Report for International Application No. PCT/US2005/011754, mailed Aug. 24, 2005.
Japanese Patent No. JP51025394, Abstract only.
JP2003183385. Publication Date. Jul. 3, 2003. Method of Manufacturing Functional Polyphenylene Ether Having Low Molecular Weight.

* cited by examiner

*Primary Examiner* — Jeffrey Wollschlager
(74) *Attorney, Agent, or Firm* — Cantor Colburn LLP

(57) ABSTRACT

A method for compression molding of poly(arylene ether) powder comprises introducing a powder comprising unheated poly(arylene ether) powder to compaction equipment comprising a compression mold and subjecting the powder in the compression mold to a pressure sufficient to produce an article having a density greater than the unheated poly(arylene ether) powder wherein the pressure is applied at a temperature less than the glass transition temperature of the poly(arylene ether) powder.

29 Claims, No Drawings

POLY(ARYLENE ETHER) COMPRESSION MOLDING

BACKGROUND OF THE INVENTION

This disclosure relates to poly(arylene ether) and more particularly to methods of forming articles from poly(arylene ether).

Poly(arylene ether) resins are commercially attractive materials because of their unique combination of physical, chemical, and electrical properties. They are a widely used class of thermoplastic engineering resins characterized by excellent hydrolytic stability, dimensional stability, toughness, heat resistance, and dielectric properties. Furthermore, the combination of poly(arylene ether) with other resins provides blends that result in additional overall desirable properties such as chemical resistance, high strength, and high flow.

Poly(arylene ether) is commercially available blended with other resins such as poly(styrene), polypropylene and polyamide. These blends are usually made using poly(arylene ether) powder. The poly(arylene ether) powder that is used in the preparation of polymer blends may have a wide particle size distribution, which can affect processability. Moreover, the density of the poly(arylene ether) powder is generally less than or equal to 0.6 gram per cubic centimeter. Such a low density requires large volumes for storage and transportation. Moreover, due to the fluffy nature of the poly(arylene ether) powder, it is difficult to feed to an extruder at higher feed rates.

Accordingly, there is a need in the art for a method of forming poly(arylene ether) powder into a compressed form that has better processability and higher density.

BRIEF DESCRIPTION OF THE INVENTION

Disclosed herein is a method for compression molding poly(arylene ether) powder. The method comprises introducing a powder comprising unheated poly(arylene ether) powder to compaction equipment comprising a compression mold and subjecting the powder in the compression mold to a pressure sufficient to produce an article having a density greater than the unheated poly(arylene ether) powder wherein the pressure is applied at a temperature less than the glass transition temperature of the poly(arylene ether) powder.

DETAILED DESCRIPTION

A method for compression molding poly(arylene ether) powder comprises introducing an unheated poly(arylene ether) powder to compaction equipment comprising a compression mold, and applying sufficient pressure to the powder in the compression mold to produce an article. As used herein poly(arylene ether) powder refers to a powder consisting essentially of poly(arylene ether) resin or a combination of two or more poly(arylene ether) resins. The compression molding method may be performed by batch or continuous processing.

All ranges disclosed herein are inclusive and combinable (e.g., ranges of "up to about 25 wt %, or, more specifically about 5 wt % to about 20 wt %" is inclusive of the endpoints and all intermediate values of the ranges of "about 5 wt % to about 25 wt %," etc.). The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

Poly(arylene ether)s are known polymers comprising a plurality of structural units of the formula (I):

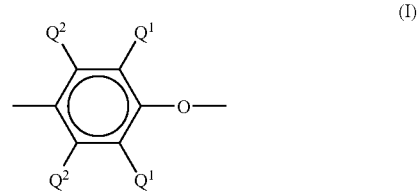

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms. In one embodiment each $Q^1$ is alkyl or phenyl, especially $C_{1-4}$ alkyl, and each $Q^2$ is hydrogen.

Both homopolymer and copolymer poly(arylene ether)s may be included. Exemplary homopolymers include those containing 2,6-dimethyl-1,4-phenylene ether units. Suitable copolymers include random copolymers containing such units in combination with (for example) 2,3,6-trimethyl-1,4-phenylene ether units. Also included are poly(arylene ether)s containing moieties prepared by grafting vinyl monomers or polymers such as polystyrenes and elastomers, as well as coupled poly(arylene ether)s in which coupling agents such as low molecular weight polycarbonates, quinones, heterocycles and formals undergo reaction in a known manner with the hydroxy groups of two poly(arylene ether) chains to produce a higher molecular weight polymer. Poly(arylene ether)s further include combinations of any of the above.

The poly(arylene ether) generally has a number average molecular weight of about 3,000-40,000 atomic mass units (amu) and a weight average molecular weight of about 20,000-80,000 amu, as determined by gel permeation chromatography. The poly(arylene ether) may have an intrinsic viscosity of about 0.08 to about 0.60 deciliters per gram (dl/g), or, more specifically, about 0.29 to about 0.48 dl/g, as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

Poly(arylene ether) is generally prepared by the oxidative coupling of at least one monohydroxyaromatic compound such as 2,6-xylenol or 2,3,6-trimethylphenol. Catalyst systems are generally employed for such coupling; they generally contain at least one heavy metal compound such as a copper, manganese or cobalt compound, usually in combination with various other materials.

Particularly useful poly(arylene ether) for many purposes are those which comprise molecules having at least one aminoalkyl-containing end group. The aminoalkyl radical is generally located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, generally obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

The poly(arylene ether) may be functionalized with a functionalizing agent comprising (a) at least one carbon-carbon double bond or carbon-carbon triple bond and (b) at least one functional group selected from carboxylic acid, acid anhydride, acid amide, imide, ester, amino, hydroxy, and the like. In one embodiment the functionalizing agent comprises maleic anhydride. Other functionalizing agents, as well as functionalizing methods, are described, for example, in U.S. Pat. No. 4,888,397 to van der Meer et al., and Japanese Patent Publication No. 2003-183385 to Tokiwa et al.

It will be apparent to those skilled in the art from the foregoing that the poly(arylene ether)s include many of those presently known, irrespective of variations in structural units or ancillary chemical features.

The poly(arylene ether) is in powder form and may have an average particle size of about 50 micrometer to about 1500 micrometers, or, more specifically about 75 micrometers to about 1250 micrometers, or, even more specifically, about 90 micrometers to about 1000 micrometers. In some embodiments the poly(arylene ether) powder has a wide particle size distribution, ranging in size from about 0.2 micrometers to about 5,000 micrometers. Particles, as used herein, may be individual particles or individual particles associated together as agglomerates and/or aggregates. In some embodiments the poly(arylene ether) powder comprises about 5 to about 70, or, more specifically, about 10 to about 65, or, even more specifically about 15 to about 60 volume percent of particles having a particle size less than about 100 micrometers, based on the total volume of the poly(arylene ether). Without being bound by theory it is believed that having a combination of particle sizes allows the smaller particles to pack between the larger particles and form an article having greater compressive strength.

The density of the poly(arylene ether) powder is less than or equal to about 0.6 grams per cubic centimetre($g/cm^3$), or more specifically, about 0.2 to about 0.5 $g/cm^3$, or, even more specifically about 0.4 to about 0.5 $g/cm^3$.

The poly(arylene ether) powder may optionally comprise various additives, for example, anti-oxidants, flame retardants, mold release agents, ultraviolet absorbers, stabilizers such as light stabilizers and others, lubricants, plasticizers, pigments, dyes, colorants, anti-static agents, blowing agents, and mixtures thereof. Exemplary antioxidants include organophosphites, for example, tris(nonyl-phenyl) phosphite, tris (2,4-di-t-butylphenyl)phosphite, bis(2,4-di-t-butylphenyl) pentaerythritol diphosphite, 2,4-di-tert-butylphenyl phosphite, or distearyl pentaerythritol diphosphite, alkylated monophenols, polyphenols and alkylated reaction products of polyphenols with dienes, such as, for example, tetrakis [methylene(3,5-di-tert-butyl-4-hydroxyhydrocinnamate)] methane and 3,5-di-tert-butyl-4-hydroxyhydrocinnamate octadecyl; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate; and amides of beta-(3,5-di-tert-butyl-4-hydroxyphenyl)-propionic acid. Fillers and reinforcing agents may also be used, such as, for example, silicates, titanium dioxide, fibers, glass fibers (including continuous and chopped fibers), carbon black, graphite, calcium carbonate, talc, and mica. Each of the above additives, particularly the reinforcing additives, must be of a suitable size to be compression molded.

Suitable flame retardants may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

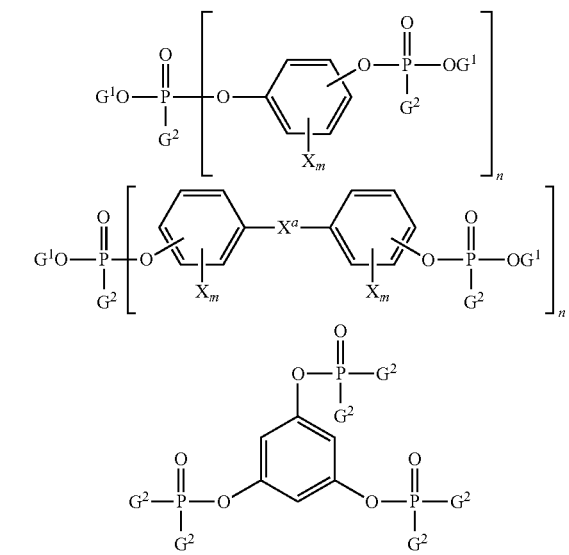

wherein each $G^1$ is independently a hydrocarbon having 1 to about 30 carbon atoms; each $G^2$ is independently a hydrocarbon or hydrocarbonoxy having 1 to about 30 carbon atoms;

each X is independently a bromine or chlorine; m 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A (, respectively, their oligomeric and polymeric counterparts, and the like. Methods for the preparation of the aforementioned di- or polyfunctional aromatic compounds are described in British Patent No. 2,043,083.

When a flame retardant is present, the mixture may comprises about 1 to about 40 weight percent flame retardant, or, more specifically, about 1 to about 30 weight percent, or, even more specifically, about 1 to about 20 weight percent flame retardant, based on the total weight of the mixture.

A binder may be added to the poly(arylene ether) to form a mixture having improved cohesion between the particles of the poly(arylene ether) powder. The binder provides flexibility in manufacturing articles using the compression molding method. The binder does not cause irreversible agglomeration of the particles of poly(arylene ether) powder when combined with the poly(arylene ether) powder prior to molding. When the binder is present, the mixture may comprise about 60 about 99.99 weight percent poly(arylene ether) powder, or, more specifically about 90 to about 99.9 weight percent, or, even more specifically, about 95 to about 99.5 weight percent, based on the total weight of the mixture. The mixture may comprise about 0.01 to about 40 weight percent binder, or, more specifically about 0.1 to about 10 weight percent, or, even more specifically, about 0.5 to about 5 weight percent binder based on the total weight of the mixture.

The binder may be a reactive binder, non-reactive binder or a combination thereof. The binder, when polymeric or oligomeric, may be crystalline or amorphous. When the binder is crystalline, the binder has a melt temperature less than or equal to the glass transition temperature (Tg) of the poly (arylene ether). When the binder is amorphous, the binder has a Tg less than or equal to the poly(arylene ether) Tg. A non-reactive binder may be any polymer or oligomer that is non-reactive with the poly(arylene ether) powder and itself. Useful non-reactive binders include vinyl acetate and its derivatives including vinyl acetate oligomers and polymers, oligomers of ethylene vinyl acetate, high impact polystyrenes (HIPS), polyolefins, and polytetrafluoroethylene dispersed in a styrene-acrylonitrile copolymer. The polytetrafluoroethylene is usually present in the dispersion in an amount of about 40 to about 60 weight percent based on the total weight of the dispersion.

Other useful non-reactive binders include elastomeric block copolymers, for example, A-B-A triblock copolymers and A-B diblock copolymers. Suitable A-B and A-B-A type block copolymers are disclosed in, for example, U.S. Pat. Nos. 3,078,254, 3,402,159, 3,297,793, 3,265,765, and 3,594, 452 and U.K. Patent 1,264,741. In one embodiment the elastomeric block copolymer comprises polystyrene-poly(ethylene-butylene)-polystyrene(SEBS), polystyrene-polybutadiene-polystyrene(SBS), polystyrene-poly(ethylene-propylene) (SEP) copolymers or a combination of two or more of the foregoing elastomeric block copolymers.

A reactive binder may be either self reactive or reactive with the poly(arylene ether) powder. The presence of a binder may improve the appearance of the compressed poly(arylene ether) powder and may enhance the flexibility in manufacturing of articles from the compressed poly(arylene ether) powder.

Useful reactive binders include functionalized oligomers wherein the functional group is selected from the group consisting of carboxyl, acyloxy, imino, imido, hydroxy, glycidyl, amine and epoxy. Exemplary reactive binders include, but are not limited to, hydroxy terminated polybutadiene, epoxidized polybutadiene, epoxidized vegetable oils, amine terminated polyethylene glycols, poly glycidyl azide oils, hydroxy terminated triethylene glycol succinate polyesters and combinations of two or more of the foregoing reactive binders.

One or more volatile components may be present in the poly(arylene ether) powder. These volatile components may act as binders when compression molding is carried out at room temperature.

A modifying agent comprising one or more polar groups may be added to the poly(arylene ether) powder. Useful modifying agents include acid halides, carbonyl containing compounds, acid anhydrides, acid amides, carboxylates, acid azides, sulfone containing compounds, nitrile containing compounds, cyano containing compounds, isocyanate esters, amine containing compounds, imide containing compounds, hydroxyl containing compounds, epoxy containing compounds, oxazoline containing compounds, and thiol containing compounds.

The compression molding method may comprise cold compaction or warm compaction of the poly(arylene ether) powder and may produce a single phase or multi phase compact. A multi-phase (or two phase) solid article may comprise a fused cover of the mixture surrounding a core of compressed poly(arylene ether) powder mixture. Alternatively, a multi-phase article may comprise a fused binder extending throughout the article. The binder may be grafted or end capped on the poly(arylene ether) powder. Compression molding increases the bulk density of the poly(arylene ether) and thereby reduces volume.

Cold compaction comprises subjecting an unheated poly (arylene ether) powder and optional components to pressure sufficient to form an article having a density of about 0.6 g/cm$^3$ to about 1.2 g/cm$^3$ and a compressive strength of about 5 kilograms(kg) to about 3000 kilograms(kg). Within this range, the density may be greater than or equal to about 0.6 g/cm$^3$, or, more specifically, greater than or equal to about 0.65 g/cm$^3$. Also within this range the density may be less than or equal to about 1.2 g/cm$^3$, or, more specifically, less than or equal to about 1.1 g/cm$^3$. The compressive strength may be greater than or equal to about 5 kg, or, more specifically, greater than or equal to about 25 kg, or, even more specifically, preferably greater than or equal to about 100 kg. The compressive strength may be less than or equal to 3000 kg, or, more specifically, less than or equal to 2500 kg, or, even more specifically, less than or equal to 2000 kg.

The poly(arylene ether) powder may be blended with the optional components prior to introduction to the compaction equipment, or if the compaction equipment comprises a means for mixing the components the poly(arylen ether) powder and optional components may be added simultaneously or sequentially.

The applied pressure is about 0.05 tons per square centimetre (tons/cm$^2$) to about 50.0 tons/cm$^2$. Within this range the applied pressure may be greater than or equal to about 1 ton/cm$^2$, or, more specifically, greater than or equal to about 2 tons/cm$^2$, or, even more specifically, greater than or equal to about 3 tons/cm$^2$. Also within this range the applied pressure may be less than or equal to about 20 tons/cm$^2$, or, more specifically, less than or equal to about 15 tons/cm$^2$, or, even more specifically, less than or equal to about 7 tons/cm$^2$. As used herein, ton refers to a metric ton.

Pressure is applied for about 0.1 seconds to about 100 seconds. Within this range pressure may be applied for greater than or equal to about 2 seconds, or, more specifically, greater than or equal to about 5 seconds. Also within this range, pressure may be applied for less than or equal to about 15 seconds, or, more specifically, less than or equal to about 10 seconds.

Compression occurs at a temperature less than the Tg of the poly(arylene ether), typically at a temperature of about 0 degrees centigrade (° C.) to about 70° C. Within this range, the temperature may be greater than or equal to about 5° C., or, more specifically, greater than or equal to about 10° C., or, even more specifically, greater than or equal to about 15° C. Also within this range, the temperature may be less than or equal to about 65° C., or, more specifically, less than or equal to about 60° C., or, even more specifically, less than or equal to about 55° C.

Warm compaction comprises introducing unheated poly (arylene ether) and optional components to compaction equipment and subjecting the poly(arylene ether) powder and optional components to sufficient pressure and temperature to form an article. The compression temperature is less than the Tg of the poly(arylene ether). The poly(arylene ether) powder and optional components, once in the compaction equipment, are heated to a temperature sufficient to at least soften the binder, when present, or the poly(arylene ether) and the binder when the binder is present, or the poly(arylene ether) in the absence of a binder to produce an at least softened poly(arylene ether) powder or poly(arylene ether) powder mixture; applying and maintaining sufficient pressure to the at least softened poly(arylene ether) powder or poly(arylene ether) powder mixture while the temperature of the at least softened poly(arylene ether) powder or poly(arylene ether) powder mixture is decreased to form an article having a density of greater than or equal to about 0.95 g/cm$^3$ and a compressive strength greater than or equal to about 4000 kg. The article density may be less than or equal to about 1.2 g/cm$^3$. The density may be greater than or equal to about 1.0 g/cm$^3$, or, more specifically, greater than or equal to about 1.05 g/cm$^3$. Within this range the density may be less than or equal to about 1.5 g/cm$^3$, or, more specifically, less than or equal to about 1.1 g/cm$^3$. The compressive strength may be greater than or equal to about 5000 kg, or, more specifically, greater than or equal to about 6000 kg.

After introducing the poly(arylene ether) powder or poly (arylene ether) powder mixture to the compaction equipment, the powder or powder mixture may be processed to reduce or remove gas, such as air, trapped between the powder particles. Useful processing includes vibration, ultrasonification, vacuum and the like. Gas, when trapped in the at least softened poly(arylene ether), may be released through simple venting, the application of vacuum, or other method known in the art.

When warm compacting a poly(arylene ether) mixture the individual components may be added simultaneously or sequentially to the compaction equipment. The poly(arylene ether) powder may be mixed with the optional components, such as a binder, in a dry blender prior to introducing the mixture to a cavity of a confined pressure device or to the feedthroat of an extruder. Batch or quasi-continuous flow mixing may be used. In one embodiment, the binder and some or all of the other optional components may be introduced via a first feed port of an extruder and the binder melted or softened by heating the extruder or by virtue of a shearing action of the extruder. The poly(arylene ether) powder is added via a second feed port of the extruder and mixed with the molten binder, wherein the second feed port is downstream of the first feed port.

When a binder is present, the compression usually occurs at a temperature greater than the melt temperature of the binder and less than the Tg of the poly(arylene ether) powder, when the binder is crystalline. The compression occurs at a temperature greater than the Tg of the binder and less than the Tg of the poly(arylene ether) powder, when the binder is amorphous.

The pressure applied is about 0.2 tons/cm$^2$ to about 20 tons/cm$^2$. Within this range the pressure applied may be greater than or equal to about 0.25 tons/cm$^2$, or, more specifically, greater than or equal to about 0.5 tons/cm$^2$ or, even more specifically, greater than or equal to about 1.0 tons/cm$^2$. Also within this range the pressure applied may be less than or equal to about 10.0 tons/cm$^2$, or, more specifically, less than or equal to about 5.0 tons/cm$^2$, or, even more specifically, less than or equal to about 2.5 tons/cm$^2$.

Pressure may be applied for about 300 seconds to about 2000 seconds. Within this range pressure may be applied for greater than or equal to about 500 seconds, or, more specifically, greater than or equal to about 900 seconds. Also within this range, pressure may be applied for less than or equal to about 1500 seconds, or, more specifically, less. than or equal to about 1200 seconds.

In another embodiment, the compression method comprises mixing the poly(arylene ether) powder with a solution of the binder in a solvent, and the mixture is isolated by devolatilization of the solvent. Suitable binder solutions include solutions resulting from polymerisation of the binder or a process following polymerisation, or the dissolution of the isolated binder in a solvent. As used herein with regard to binder solutions the term solution includes both solutions and suspensions. Devolatization is the removal of solvent through the elevation of temperature, the reduction of pressure or a combination thereof. The devolatization is carried out at a temperature less than the Tg of the poly(arylene ether). The isolation of the mixture may be carried out in a devolatilizing extruder although other methods involving spray drying, wiped film evaporators, flake evaporators, flash vessels with metal pumps and combinations of two or more of the foregoing methods may be used. The isolated mixture may then be compacted, if necessary, by cold compaction or warm compaction as described above.

Devolatilizing extruders and processes are known in the art and typically involve a twin-screw extruder equipped with multiple venting sections for solvent removal. The devolatilizing extruders most often contain screws with numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including Welding Engineers, Inc.

Using the cold or warm compaction method, the poly (arylene ether) powder may be compacted into small pellets, small disks with varying thickness or into large sheets of varying thickness. Useful compaction equipment includes both confined pressure devices and extrusion devices. In a confined pressure device the poly(arylene ether) powder or powder mixture is directly consolidated in a closed mold or between two opposing surfaces. Compression is done either into mold to give a final shape or into a sheet or block that is later broken up to achieve the desired shape and size. In extrusion devices the poly(arylene ether) powder or powder mixture undergoes shear and is consolidated while being subjected to pressure in a die. Extrudates may be formed under pressure in dies having a variety of cross sections and as they leave the die they may be broken up or cut to size. Useful confined pressure devices include pistons, molding presses, tableting presses, roll compactors, pre-getting rolls, briquetting rolls, gear pelleters and combinations of the foregoing. It should be noted that some compression rolls, while not individually comprising a cavity, nevertheless when used in combination with a second compression roll comprise a cavity between the two compression rolls. Extrusion devices include pellet mills, ring pellet mills, double roll extruders, and single screw and twin screw extruders. As used herein and throughout the specification the term "compression mold" refers to the cavity in which the poly(arylene ether) powder is compressed, including a die head attached to an extruder. In one embodiment, the pellets have a diameter of about 2 millimetres(mm) to about 25 mm, and a height of about 1 mm to about 50 mm. In another embodiment, the disks have a thickness of about 1 mm to about 50 mm. In yet another embodiment, the sheets have a thickness of about 2 mm to about 50 mm.

The compression molding method may be used to prepare pellets having any arbitrary shape. Particularly useful pellet cross sectional shapes include spherical, cylindrical, cubical, elliptical right prism, ellipsoidal, cylindrical with torrispherical heads, elliptical with ellipsoidal heads, rectangular or square right prisms, rectangular or square right prism with rounded edges.

The compression molding method is effective in manufacturing pellets having high bulk density compared to the poly(arylene ether) powder. The high bulk density of the compacted pellets reduces the volume occupied by the material during storage and transportation and thereby reduces the costs involved in the storage and transportation of the poly(arylene ether) pellets. Moreover, the compacted poly(arylene ether) pellets may be fed to an extruder at higher feed rates than can be employed with poly(arylene ether) powder.

The compression molded poly(arylene ether) articles may be subjected to further processing including sanding, and painting or powder coating and used in various applications such as domestic electric appliances, electric and electronic parts, construction materials, automobile parts, communication devices and information management transmission parts. Particularly, the molded material may be used in television housing, television chassis, deflection shock, other television parts, AC adaptor, electricity source box, air conditioner parts, audio parts, radiator cover, monitor housing, monitor chassis, liquid crystal projector housing, antenna cover, printer housing, printer chassis, scanner housing, scanner chassis, terminal adaptor, modem, and electric wiring insulation parts.

Further, it may be used in bathtub parts, shower head, pump housing, parts of air purifier, parts used in kitchens, pipes, gutter, sound barrier walls, window frame, toys, gardening tools, fishing tackles, foodstuff containers and cosmetic containers.

Further automobile part examples include instrument panel, center console, meta console, glove box, airbag, defroster garnish, air duct, heater control, steering column cover, air defroster, door trim, sunshade, roof liner, pillar cover, pillar impact absorber, bonnet air scoop, radiator grill, signal lamp part, fog lamp part, door handle, door mirror, door panel, quarter panel, battery tray and battery housing.

Also, the compression molded poly(arylene ether) may find application in the aerospace industry. Applications include missile and aircraft stabilizer fins, wing ribs and panels, fuselage wall linings, overhead storage compartments, ducting, fasteners, engine housings and helicopter fairings.

Moreover, the compression molded sheets of poly(arylene ether) may find application in mines and thermal power stations due to their high impact strength and high abrasion resistance. Compression molded sheets of poly(arylene ether) may find application in the lining for the hopper of furnaces. In such applications the linings are frequently exposed directly to the fire. Ultra-high molecular weight polymers of poly(arylene ether) are excellent in chemical resistance and may give sheets having higher impact strength and abrasion resistance required for such critical applications.

The disclosure is further illustrated by the following non-limiting examples.

EXAMPLES 1 TO 3

The raw material used in the following examples was a powder of poly(2,6-dimethyl-1,4-phenylene) ether having a density of 0.45 grams per cubic centimetre and an intrinsic viscosity of 0.41 dl/g as measured in chloroform at 25° C. and containing about 35 to about 45 volume percent particles with a size less than 100 micrometers.

The compression mold consisted of a cavity in the form of a hollow stainless steel cylinder with a surrounding aluminum sleeve, with the cylinder measuring 55 mm in the outside diameter, 10 mm in the inside diameter or base diameter, and 45 mm in height. Also, the compression mold has a stainless steel piston, with the piston measuring 60 mm in height and 10 mm in diameter.

0.38 grams of poly(arylene ether) powder was introduced to the compression mold at room temperature. The piston was fixed, and a hydraulic compression press applied a pressure for 5 seconds, after which the molded piece was taken out of the mold. These molded pellets were tested under compressive load in a Zwick Z010 machine, and the load at which the pellet started to disintegrate was measured which hereinafter is referred as the compressive strength.

Table 1 shows the value of the temperature in °C., pressure in tons per square centimeter (tons/cm$^2$), weight of the poly(arylene ether) powder in grams (g), density of the molded pellets in grams per cubic centimeter (g/cm$^3$), compressive load of the molded pellets in Newton (N), compressive strength of the molded pellets in kilograms (kg) and the compressive stress of the molded pellets in megapascal (MPa). Table 1 also shows the dimension ratio of the molded pellets which is a ratio of the diameter of the molded pellets in millimeter (mm) to the height of the molded pellets in mm. The compressive load as shown in the table is the load on the sample at the yield point. All the values shown in the table are an average of five tested samples.

TABLE 1

| Ex. | Temp | Pressure | Height | Dimension Ratio | Weight | Density | Compressive Load | Compressive Strength | Compressive Stress |
|---|---|---|---|---|---|---|---|---|---|
| 1 | 25 | 1 | 6.27 | 1.606 | 0.37 | 0.748 | 1705.96 | 173.90 | 21.42 |
| 2 | 25 | 2 | 5.63 | 1.790 | 0.38 | 0.858 | 3709.14 | 378.10 | 46.57 |
| 3 | 25 | 3 | 5.15 | 1.945 | 0.38 | 0.948 | 4997.89 | 509.47 | 63.51 |

No separation or cracking was seen on the surface of these compression molded pellets. The density of the article produced from the compression molding of poly(arylene ether) powder was greater than the density of the poly(arylene ether) powder as can be interpreted from the above table.

EXAMPLES 4 TO 6

The same procedure as in Example 1 was carried out, except that the mold consisted of a cylinder of 16 millimetres base diameter.

1.5 grams of poly(arylene ether) powder was filled in the compression mold at room temperature. The piston was then fixed, and a pressure was applied by a hydraulic compression for 5 seconds, after which the molded piece was taken out of the mold. These molded pellets were tested as in Examples 1-3. Data is shown in Table 2.

TABLE 2

| Ex. | Temperature | Pressure | Height | Dimension Ratio | Weight | Density | Compressive Load | Compressive Strength | Compressive Stress |
|---|---|---|---|---|---|---|---|---|---|
| 4 | 25 | 1 | 9.67 | 1.663 | 1.51 | 0.768 | 4599.54 | 468.86 | 22.68 |
| 5 | 25 | 2 | 8.04 | 1.999 | 1.50 | 0.917 | 11217.94 | 1143.52 | 55.31 |
| 6 | 25 | 3 | 7.87 | 2.043 | 1.52 | 0.951 | 12792.18 | 1303.99 | 63.07 |

No separation or cracking was seen on the surface of these compression molded pellets. The density of the article produced was greater than the density of the poly(arylene ether) powder.

EXAMPLES 7 TO 9

The same procedure as in Examples 4-6 was carried out, except that the dimension ratio of the compression molded pellets was about 1.

3.0 grams of poly(arylene ether) powder was placed in the compression mold at room temperature. The piston was then fixed, and a pressure was applied by a hydraulic compression for 5 seconds, after which the molded piece was taken out of the mold. These molded pellets were as in Examples 1-6. Data is shown in Table 3.

TABLE 3

| Ex. | Temperature | Pressure | Height | Dimension Ratio | Weight | Density | Compressive Load | Compressive Strength | Compressive Stress |
|---|---|---|---|---|---|---|---|---|---|
| 7 | 25 | 1 | 19.68 | 0.817 | .93 | 0.733 | 1982.56 | 202.10 | 9.77 |
| 8 | 25 | 2 | 16.17 | 0.994 | .99 | 0.913 | 7389.22 | 753.23 | 36.43 |
| 9 | 25 | 3 | 15.43 | 1.041 | 3.01 | 0.960 | 9653.25 | 984.02 | 47.59 |

No separation or cracking was seen on the surface of these compression molded pellets or tablets. The compression strength of the compression molded pellets in examples 7 to 9 is less than the compressive strength of the pellets in example 4 to 6.

EXAMPLE 10

The same procedure as in Examples 4-6 was carried out, except that the raw material used was a poly(arylene ether) powder with an intrinsic viscosity of 0.46 and containing about 35 to about 45 volume percent particles with a size less than 100 micrometers.

1.5 grams of poly(arylene ether) powder was filled in the compression mold at room temperature. The piston was then fixed, and a pressure was applied by a hydraulic compression for 5 seconds, after which the molded piece was taken out of the mold. These molded pellets were tested as in Examples 1-9. Results are shown in Table 4.

TABLE 4

| Ex. | Temperature | Pressure | Height | Dimension Ratio | Weight | Density | Compressive Load | Compressive Strength | Compressive Stress |
|---|---|---|---|---|---|---|---|---|---|
| 10 | 25 | 3 | 7.65 | 2.101 | 1.49 | 0.957 | 18110.86 | 1846.16 | 89.29 |

No separation or cracking was seen on the surface of these compression molded pellets.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for compression molding of poly(arylene ether) powder, comprising:
   introducing a powder comprising unheated poly(arylene ether) powder to compaction equipment comprising a compression mold; and
   subjecting the powder in the compression mold to a pressure of 1 to 50 tons per square centimeter to produce an article having a density of about 0.6 to about 1.2 grams per cubic centimeter, a compressive strength of greater than or equal to about 25 kg, and a diameter to height ratio of 1.6 to 2.1, wherein said pressure is applied at a temperature of 0 to 65° C.

2. The method of claim 1 wherein the temperature is 0 to about 60° C. and the pressure is applied for about 0.1 to about 100 seconds.

3. The method of claim 2, wherein the article has a compressive strength of about 25 to about 3000 kilograms.

4. The method of claim 1 wherein the pressure is 1 to about 20 tons per square centimeter, the pressure is applied for about 300 to about 2000 second and the temperature is sufficient to at least soften the poly(arylene ether) powder and/or a binder when present.

5. The method of claim 4 wherein the article has a compressive strength greater than about 4000 kilograms and a density of greater than or equal to about 0.95 grams per cubic centimeter.

6. The method of claim 4 wherein the poly(arylene ether) is processed to remove or reduce gas trapped between the particles.

7. The method of claim 1, wherein the powder further comprises a binder, a flame retardant, an additive, a modifying agent or a combination of two or more of the foregoing.

8. The method of claim 7, wherein the binder is crystalline and has a melt temperature less than the glass transition temperature of the poly(arylene ether) powder.

9. The method of claim 7, wherein the binder is amorphous and has a glass transition temperature less than the glass transition temperature of the poly(arylene ether) powder.

10. The method of claim 7, wherein the binder is a reactive binder.

11. The method of claim 7, wherein the binder is a non-reactive binder.

12. The method of claim 7, wherein the additive is selected from the group consisting of antioxidants, mold release agents, ultra violet absorbers, stabilizers, lubricants, plasticizers, pigments, dyes, colorants, antistatic agents, blowing agents, and mixtures thereof.

13. The method of claim 7, wherein the binder is present in an amount of about 0.01 to about 40 weight percent, based on the total weight of the mixture.

14. The method of claim 1, wherein the compression mold is unheated upon introduction of the powder.

15. The method of claim 1, wherein the compression mold is heated after introduction of the powder.

16. The method of claim 15, wherein the compression mold is not heated during compressing.

17. The method of claim 1, wherein the compression mold is heated prior to introduction of the powder.

18. The method of claim 17, wherein the compression mold is heated after introduction of the powder.

19. The method of claim 17, wherein the compression mold is not heated during the application of pressure.

20. The method of claim 1, wherein the compression mold is a die of an extruder.

21. The method of claim 1, wherein the article is a single phase compact.

22. The method of claim 1, wherein the article is a multi phase compact.

23. The method of claim 1, wherein the poly(arylene ether) powder comprises about 5 to about 70 volume percent, based on the total volume of poly(arylene ether) powder, of particles having a particle size less than about 100 micrometers.

24. The method of claim 1 wherein the poly(arylene ether) powder has an average particle size of about 50 to about 1500 micrometer.

25. The method of claim 1 wherein the compaction equipment is a confined pressure device.

26. The method of claim 1 wherein the compaction equipment is an extrusion device.

27. The method of claim 1, wherein the poly(arylene ether) has an intrinsic viscosity of 0.08 to 0.60 deciliters per gram as measured in chloroform at 25° C.

28. The method of claim 1, wherein the poly(arylene ether) has an average particle size of 90 to 1000 micrometers and 15 to 60 volume percent of the particles have a particle size less than about 100 micrometers, based on the total volume of poly(arylene ether).

29. A method for compression molding of poly(arylene ether) powder, comprising:
  introducing an unheated poly(arylene ether) powder to compaction equipment comprising a compression mold, wherein the poly(arylene ether) has an intrinsic viscosity of about 0.29 to about 0.48 dl/g, as measured in chloroform at 25° C.;
  subjecting the unheated poly(arylene ether) powder in the compression mold to a pressure of 1 to 50 tons per square centimeter to produce an article having a density of about 0.6 to about 1.2 grams per cubic centimeter, a compressive strength of greater than or equal to about 25 kg, and a diameter to height ratio of 1.6 to 2.1, wherein said pressure is applied at a temperature of 0 to 65° C.

* * * * *